March 18, 1958     P. VANET     2,827,246
METHOD AND APPARATUS FOR CONTROLLING BIREFRINGENT WEB
Filed Nov. 2, 1956     2 Sheets-Sheet 1

INVENTOR
PAUL VANET
BY
ATTORNEY

March 18, 1958 P. VANET 2,827,246
METHOD AND APPARATUS FOR CONTROLLING BIREFRINGENT WEB
Filed Nov. 2, 1956 2 Sheets-Sheet 2

INVENTOR
PAUL VANET
BY
ATTORNEY

United States Patent Office 2,827,246
Patented Mar. 18, 1958

2,827,246

METHOD AND APPARATUS FOR CONTROLLING BIREFRINGENT WEB

Paul Vanet, Paris, France, assignor to Societe Cellophane Investment Company Limited Application November 2, 1956, Serial No. 620,028

Claims priority, application France November 4, 1955

5 Claims. (Cl. 242—57.1)

This invention relates to a method and apparatus for maintaining the edge of a moving web in pre-dimensional alignment and more particularly to an apparatus using a light sensitive scanning means and suitable for use with the transparent film. With many applications of films wound as films of great length, for example in continuous printing or in the manufacture of bags or sachets using films or paper-like webs, such as those of regenerated cellulose, it is necessary to ensure that the spools unwind in such manner that the edge of the film always maintains an accurately adjusted position in the transverse direction.

The apparatus used for obtaining this result with a sufficient degree of precision are generally electronic devices which comprise an optical system projecting a narrow luminous area on to the edge of the film as it is unwinding. The effect of a transverse displacement of the edge of the film is to modify the flux diffused or reflected by the film and the luminous flux which reaches the said film. A photoelectric cell associated with an amplifier uses these variations in flux in order to control a mechanical device which automatically displaces the film spool in a suitable direction in order to bring the edge of the film to the position required in relation to the luminous area formed by the optical device.

The process is easy to carry into effect in the case of opaque films or colored transparent films or very bright films having a rigid undeformed edge, but it can only be applied with difficulty to thin colorless transparent films, such as the films of regenerated cellulose having a thickness of 2 to 5 hundredths of a millimetre and of which the frequently undulated edge is not always fully adapted to the use of an optical device using reflection of optical light.

The present invention, which enables these difficulties to be avoided, is applicable to transparent colorless films having birefringent properties, such as films of regenerated cellulose, polyethylene, polyvinyl chloride, etc. It is based on the fact that if a thin birefringent film is interposed at a suitable angle in a polarizing apparatus adjusted for the extinction of the incident light, the illumination is re-established at the outlet from the analyzer. The intensity of the light thus re-established will vary according to the fraction of luminous flux intercepted by the film inserted between the analyzer and the polarizer and it will be possible to utilize this light for controlling a device such as that which has been referred to above.

Figure 1:
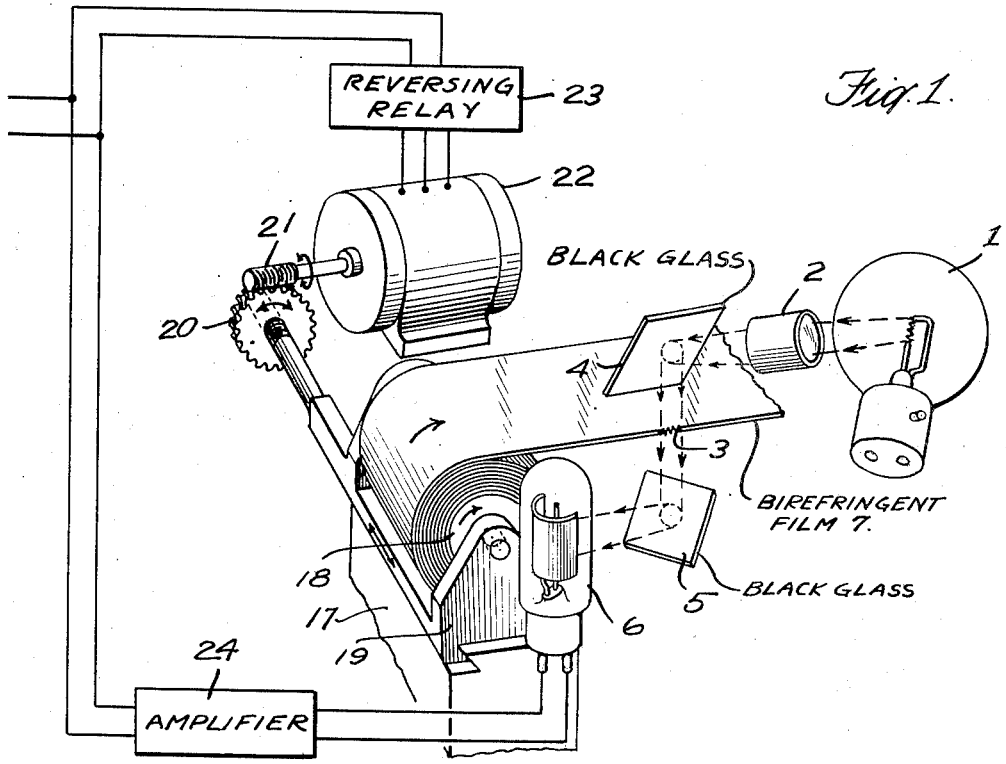
Fig. 1 is a diagrammatic view illustrating one embodiment of the invention.

Fig. 1 shows a low voltage lamp 1 of which the coiled filament supplies a luminous rectangle of small dimensions, for example, 5 x 1 mm., to an objective 2, which forms an image thereof 3 by reflection of the emergent beam of the objective on a sheet of black glass 4. The light beam falls on a second sheet of black glass 5 and as the two sheets of glass are oriented in such manner as to form a polarizing apparatus operating at the angle giving the maximum effect, that is to say, at angles of incidence in the region of 55°, the glass sheet 5 practically extinguishes the beam of polarized light which it receives in such manner that it only reflects a very small amount of light on to the plate of the photoelectric cell 6. This assumes that no film is interposed between the two black sheets of glass, but if a thin birefringent film 7 is introduced into the image 3 of the filament perpendicular to the axis of the light beam polarized and oriented in such manner that its edge lies parallel to the production axis and an angle of about 45° is formed with the incidence planes, the cell 6 will be illuminated and will act on the device for automatically adjusting the edge of the film as a function of the greater or lesser interception of the image 3 of the filament by the film.

The reformation of the light by the film is due to a chromatic polarization phenomenon resulting from the birefringence recorded by internal tensions of the film. For the usual thicknesses of film, the light received at the outlet of the analyzer is white, in the same way as the incident light. For greater thicknesses, for example the strips obtained by sticking two or more single films together, the emergent light will be colored, but the device will still be applicable by using a cell which is sensitive to the complementary shade or tone of the color obtained.

The polarizer system comprising two sheets of black glass can be replaced by two Nicol's prisms or by two polaroid plates.

Figure 2:
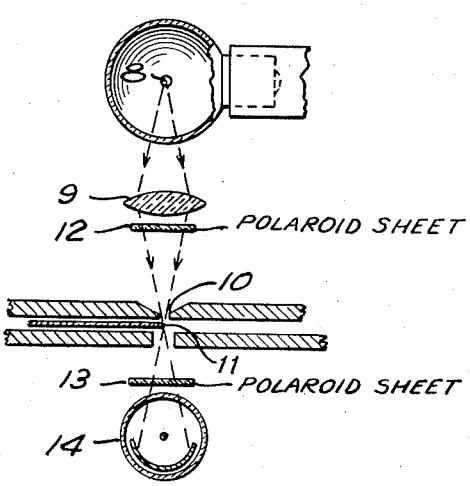
Figs. 2 and 3 are similar diagrammatic views illustrating further embodiments of the invention.

Fig. 2 shows a second embodiment of a suitable device with an apparatus using sheets of material known under the trade name "Polaroid" as the polarizer and as the analyzer.

The coiled filament 8 of a low voltage incandescent lamp disposed perpendicular to the plane of Fig. 2 forms its image through a convergent lens 9 on a slot 10, beneath which the edge 11 of the film travels perpendicular to the plane of Fig. 2.

Two sheets of "Polaroid" film are disposed at 12 and 13, and the drawing directions of the active crystals of these sheets are at 90° relatively to one another. The edge of the film is disposed along the bisector of this right-angle. A photoelectric cell 14 is disposed beneath the slot. If the edge of the film is displaced from the slot towards the left, no light falls on the cell, because this light is extinguished by the analyzer 13. On the other hand, if the edge of the film is displaced towards the right, the polarized light leaving the "Polaroid" sheet 12 passes through this film and falls on the "Polaroid" sheet 13, through which it passes without extinction, so that the cell 14 is then illuminated.

In the case where it would be desired to use these devices for opaque films, it would be sufficient to replace one or both of the sheets of black glass of Fig. 1 with metal mirrors or to omit one or both of the "Polaroid" sheets of Fig. 2.

The electronic and mechanical devices are applicable to any type of automatic apparatus for aligning the film. For example, a holder 17 for the film supply spool 18 is provided with a mechanical member 19 which can be displaced along its axis and which is actuated by an assembly comprising a wheel 20 and an endless screw 21. The endless screw 21 is driven by a three-phase reversible motor 22. The reversal of the motor is controlled by a relay 23 actuated through an amplifier 24 which is connected to supply current varying for example between two and ten milli-amperes, according to whether the cell 6 is dark or illuminated. The relay 23 will cause the motor 22 to turn in one direction when the relay 23 is not engaged and in the reverse direction when the relay 23 is engaged, so that the spool holder 17 will continuously carry out an alternating displacement of small amplitude, about the theoretically correct position. If it is impossible to carry out the adjustment of the film very close to the spool which is unwinding, this alternative displacement will not be sensitive at the place where the pick-up is used, because it is transmitted to this point with a delay which is accompanied by an appreciable reduction of the amplitude of oscillation.

It will of course be possible to employ any other known mechanical, hydraulic and electronic means for using the indications supplied by the optical control device using polarized light.

The maximum effect is obtained by arranging the plane of the film perpendicular to the beam of polarized light, and by orienting its longitudinal direction of manufacture to about 45° with respect to the polarizing plane. However, these conditions do not have to be strictly maintained and even with an appreciable variation in the orientation of the film, it is possible to obtain a sufficient degree of re-establishment of the light in order to act effectively on the photoelectric cell and the equipment which it sets in operation.

It has been recognized that the polarized light and the phenomena due to the birefringence of the films can be used under other conditions.

In particular a different phenomenon is obtained with the film, if in the arrangement of equipment and film as referred to above, the analyzer is turned through 90° instead of being placed in the position of extinction with respect to the polarizer. The effect of this turning movement is that the polarizer cancels out its effect in the absence of film and allows the light falling on the analyzer to pass without extinction. The film then partially obscures the light flux leaving the analyzer and it is given a color corresponding to an appreciable decrease of the light energy transmitted.

It will be possible to use this phenomenon under the same conditions as those described above by taking into account the fact that in the new position in which the two "Polaroid" sheets are not crossed, the appearance of the film in the window will weaken the light flux received by the photoelectric cell.

By making use of suitably chosen colored screens, it is possible to accentuate the contrast existing between the illumination in the absence of the film and the illumination after interception of the film between the polarizer and the analyzer. A type of photoelectric cell will be chosen which is sensitive to the difference existing between the light fluxes thus obtained.

It is obvious that the orientations indicated for the polarizer, the analyzer and the film are not absolute. They permit the maximum effect to be obtained, but the results will be satisfactory with a certain variation in these orientations.

Figure 3:
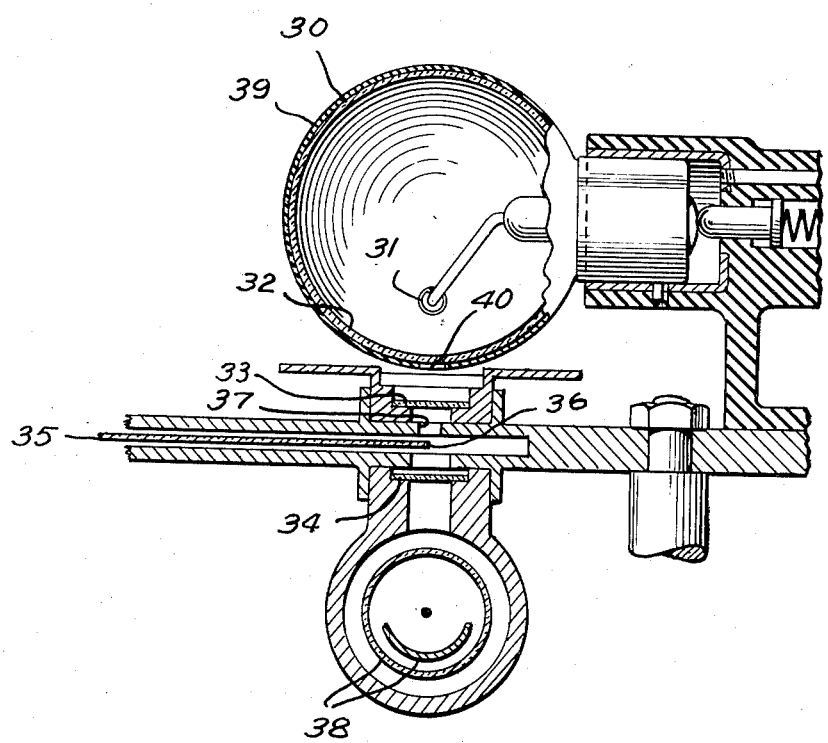

The arrangement shown in Fig. 3 is applicable not only to colorless films having birefringent properties, but to the same films when they are colored.

In Fig. 3 a lamp 30 is shown having an incandescent filament 31 of low voltage and few watts. This filament is shown as very compact and eccentrically disposed, thus making it possible for the light spot to be placed relatively close to the control window for the film. Light rays from the lamp 30 pass through an envelope of glass 32 having strong absorption for infra red, but transparent to the luminous part of the spectrum and through a pair of sheets 33 and 34 between which the film 35 passes with its edge 36 disposed beneath the window 37 and in the path of the light rays. The rays are then applied to a photoelectric cell 38.

The lamp 30 is covered with matt black varnish (shown in double lines 39) except on the small portion 40 of its surface which must allow the passage of the light beams illuminating the window 37.

This embodiment may be operated either by arranging the two "Polaroid" sheets to intersect one another at 90° in order to effect extinction of the light rays, or by arranging them with parallel orientation to pass light rays.

As pointed out above it is desirable to effect optical registration of the edge of the film at a short distance from the unwinding point. This assumes that the unwinding axis of the film spool is exactly in accordance with the axis of the original winding of this film. In practice, however, the film is sometimes wound on a movable tube or a mandrel and it frequently happens that the original winding axis and the new unwinding axis form between them a small angle which has for effect to produce a periodic transverse displacement of the edge of the film with each unwinding revolution.

In order to prevent oscillations due to an imperfect winding on the spool, it is preferable to locate the sending device in the proximity of a guide roller rather than in the proximity of the spool itself.

What is claimed is:

1. Apparatus for positioning at a sensing station the edge of a moving film of a material having birefringent properties, comprising a light source directing a beam of light past said edge at said sensing station, a light polarizer disposed in advance of said station to polarize said light beam, a polarization analyzer disposed beyond said station, a photoelectric element receiving the beam from said analyzer, and means responsive to the energization of said photoelectric cell to alter the position of said film in a sense to maintain said edge in predetermined position at said sensing station.

2. A device as set forth in claim 1 in which said polarizer and said analyzer are relatively disposed to intercept the light beam when the beam is not intercepted by said film, and to pass said beam when the beam becomes depolarized by passage through said film.

3. A device as set forth in claim 1 in which said polarizer and said analyzer are relatively disposed to pass the polarized beam to said photoelectric element and said element is adapted to respond to variations in the intensity of said beam due to the interception thereof by a varying portion of said film at said sending station.

4. The device set forth in claim 1 in which the polarizer and analyzer comprise reflecting sheets of black glass.

5. The device set forth in claim 1 in which the polarizer and analyzer comprise Polaroid sheets.

References Cited in the file of this patent

FOREIGN PATENTS

| | | |
|---|---|---|
| 435,899 | Great Britain | Oct. 1, 1935 |
| 762,837 | Great Britain | Dec. 5, 1956 |
| 528,735 | Canada | Aug. 7, 1956 |